July 29, 1930.   E. M. WRIGHT   1,771,474
ROTOR FOR ELECTRIC MOTORS
Filed April 4, 1928
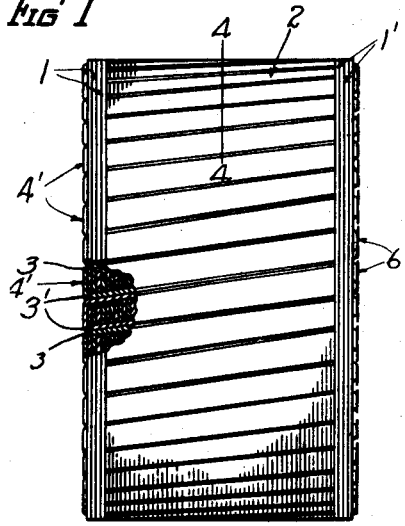
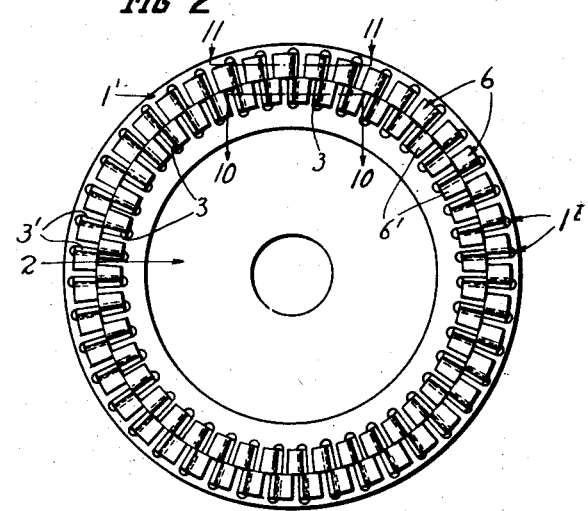
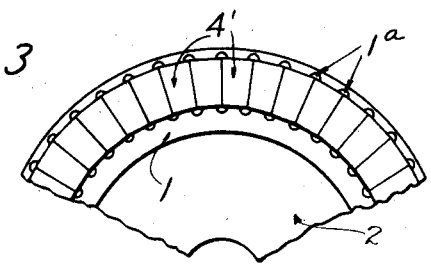
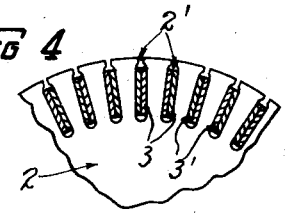
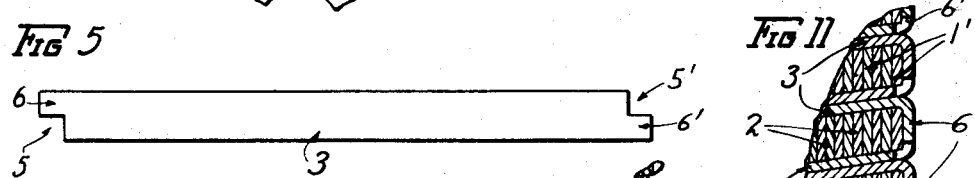
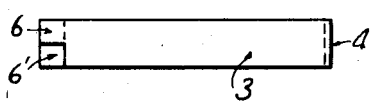
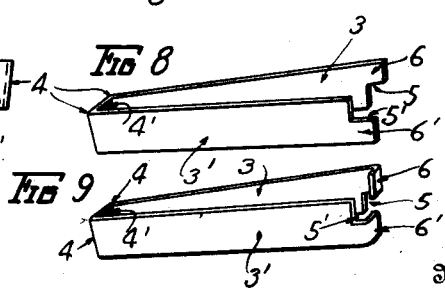
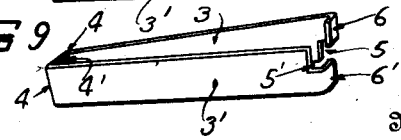
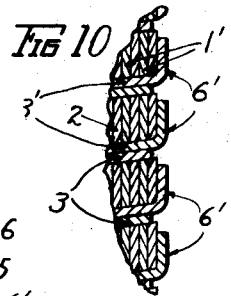
Inventor
Edwin M. Wright
By Staley & Welch
Attorneys Patented July 29, 1930

1,771,474

UNITED STATES PATENT OFFICE

EDWIN M. WRIGHT, OF SPRINGFIELD, OHIO, ASSIGNOR, BY MESNE ASSIGNMENTS, TO ROBBINS & MYERS, INC., OF SPRINGFIELD, OHIO, A CORPORATION OF OHIO

ROTOR FOR ELECTRIC MOTORS

Application filed April 4, 1928. Serial No. 267,312.

This invention relates to rotors for electric motors of the squirrel cage type, it more particularly relating to the formation of the conductor bars of the rotor.

The object of the invention is to provide a conductor bar for rotors of the character referred to so constructed as to insure good electrical contacts between the ends of the bars and the end rings or plates of the rotor, and, further, whereby the bars may be secured in position by rapid mechanical means and with a minimum amount of hand work.

In the accompanying drawings:

Fig. 1 is a side elevation of a rotor embodying my improvements, partly broken away and shown in section.

Fig. 2 is an elevation of one end of the same.

Fig. 3 is an elevation of a portion of the opposite end from that shown in Fig. 2.

Fig. 4 is a section on the line 4—4 of Fig. 1.

Fig. 5 is a view of one of the strips of metal which forms a pair of conductor bars before same is bent to form.

Fig. 6 is a view of the strip of metal after bending to form.

Fig. 7 is an end view of the same after bending.

Fig. 8 is a perspective view of the same after bending as it appears before application to the rotor.

Fig. 9 is a perspective view of the same showing the manner of bending the reduced end of each bar to clinch it to the rotor ring.

Fig. 10 is an enlarged section on the line 10—10 of Fig. 2.

Fig. 11 is an enlarged section on the line 11—11 of Fig. 2.

Referring to the drawings, 1 represents the end conducting rings at one end of the rotor and 1' the rings at the opposite end of the rotor, four superimposed plates being shown in the present case, although a lesser or greater number of rings may be employed with good results. The core made up in the usual way of a series of magnetizable disks or plates 2, the outer peripheries of which are slotted in the usual way as indicated at 2' to receive the connecting conductor bars 3 and 3'. The end rings are also provided with slotted openings 1ª and 1ᵇ registering with the slots of the core to receive the conductor bars. In the present case the conductor bars are of the hair pin type; that is, the central portion of a strip of metal is bent at the points indicated at 4 (Figs. 6, 7, 8 and 9) so that two bars 3 and 3' are formed from a single strip of metal. The free end of each bar is notched, as indicated at 5 and 5', so as to provide reduced end portions 6 and 6' extending substantially one half the width of the bar. The bar 3 is notched in its lower half and the bar 3' notched in its upper half so that the reduced end portions will stand in different planes or in staggered relation permitting them to be bent toward each other as shown.

In assembling, each pair of bars is inserted through two adjacent slots and grooves in the rings 1, core 2 and rings 1', with the reduced ends 6 and 6' projecting beyond the outermost ring 1' with said ends lying in different radial planes and at different distances from the center of the rotor. These reduced ends are then bent toward each other as shown and firmly clinched side by side to the outermost end ring 1' and at the same time the intermediate portion 4' is firmly pressed against the outermost ring 1.

By this arrangement each bar will have a direct electrical contact with the outermost end rings insuring good electrical connections between the bars and rings. Further, in the operation of clinching the bars to the end rings, the reduced ends 6 and 6' and the intermediate portions 4' of all bars may be simultaneously clinched by mechanical devices with a minimum expenditure of time and labor.

Having thus described my invention, I claim:

1. In a rotor for electric motors, a core, end conducting rings, and a plurality of conductor bars extending through said rings and core, said bars being arranged in pairs formed from a single strip of metal with the free end of each bar formed with a reduced extension, the bars of each pair when assembled being spaced apart and the extensions of said bars being located different distances from the center of said rotor so that the extensions of each pair when bent lie side by side each in direct contact with the adjacent ring.

2. In a rotor for electric motors, a core, end conductor rings, and a plurality of conductor bars extending through said rings and core, said bars being arranged in pairs, with the bars of each pair formed from a single strip of metal, the central portion of said strip of metal being formed with two angled spaced-apart bends so that the bars stand in parallel spaced-apart relation, the free ends of said bars being each provided with a reduced extension and an adjacent blank space, said reduced extensions and blank spaces being in staggered relation whereby when bent toward each other they will lie in direct contact with the adjacent end ring.

3. In a rotor for electric motors, a core, end conducting rings, and a plurality of conductor bars extending through said rings and core, each of said bars at an end of said rotor having a single reduced portion, the reduced portions of adjacent bars being out of circumferential alignment with each other to provide an inner row and an outer row of reduced portions, one row of said reduced portions being adapted to be all bent in one direction and the other row in the opposite direction against the adjacent conducting ring.

4. In a rotor for electric motors, a core, end conducting rings, and a plurality of conductor bars extending through said rings and core, each of said bars at an end of said rotor having a single reduced portion and a blank portion adjacent the reduced portion, the reduced portions of adjacent bars being out of circumferential alignment with each other and the blank portions likewise disposed whereby when said reduced portions are bent against the rings they will lie in direct contact therewith throughout their length.

5. In a rotor for electric motors, a core, end conducting rings, and a plurality of conductor bars extending through said rings and core, said bars being arranged in connected pairs with the bars of each pair formed from a single strip of metal, the free ends of the bars of each pair being oppositely notched to form a single reduced extension for each bar, with the extension of one bar of the pair in staggered relation with the extension of the other bar, whereby when said extensions are bent they each lie in direct contact with the adjacent ring.

In testimony whereof, I have hereunto set my hand this 28th day of March, 1928.

EDWIN M. WRIGHT.